(12) United States Patent
Endo et al.

(10) Patent No.: US 7,127,723 B2
(45) Date of Patent: *Oct. 24, 2006

(54) INFORMATION PROCESSING APPARATUS WITH MULTIPLE OPERATING SYSTEMS

(75) Inventors: Yoshinori Endo, Mito (JP); Mariko Okude, Hitachi (JP); Hideo Hiroshige, Hitachi (JP); Kozo Nakamura, Hitachiota (JP); Yukihiro Kawamata, Hitachi (JP); Kimiya Yamaashi, Hitachi (JP)

(73) Assignees: Hitachi, Ltd., Tokyo (JP); Xanavi Informatics Corporation, Zama (JP)

( * ) Notice: Subject to any disclaimer, the term of this patent is extended or adjusted under 35 U.S.C. 154(b) by 304 days.

This patent is subject to a terminal disclaimer.

(21) Appl. No.: 09/796,715

(22) Filed: Mar. 2, 2001

(65) Prior Publication Data

US 2001/0029550 A1 Oct. 11, 2001

(30) Foreign Application Priority Data

Mar. 2, 2000 (JP) ............................. 2000-057810

(51) Int. Cl.
*G06F 9/44* (2006.01)
(52) U.S. Cl. ...................... 719/319; 701/1; 701/36
(58) Field of Classification Search ............... 709/319, 709/226; 713/1, 100; 717/168, 162; 710/240, 710/62; 701/36–200, 1; 719/319
See application file for complete search history.

(56) References Cited

U.S. PATENT DOCUMENTS

| | | | | |
|---|---|---|---|---|
| 4,493,034 A | * | 1/1985 | Angelle et al. | ............. 713/100 |
| 4,675,814 A | * | 6/1987 | Murai et al. | ................. 717/162 |
| 4,993,017 A | | 2/1991 | Bachinger et al. | |
| 5,027,271 A | * | 6/1991 | Curley et al. | ................ 710/240 |
| 5,129,084 A | | 7/1992 | Kelly, Jr. et al. | |
| 5,134,580 A | * | 7/1992 | Bertram et al. | ................. 713/1 |
| 5,230,065 A | * | 7/1993 | Curley et al. | ................ 709/226 |
| 5,278,973 A | * | 1/1994 | O'Brien et al. | ............. 717/168 |
| 5,483,647 A | * | 1/1996 | Yu et al. | ...................... 713/100 |
| 5,878,369 A | | 3/1999 | Rudow et al. | |
| 5,889,473 A | | 3/1999 | Wicks | |
| 6,023,241 A | | 2/2000 | Clapper | |
| 6,381,524 B1 | * | 4/2002 | Kuragaki et al. | ............. 701/36 |
| 6,633,930 B1 | * | 10/2003 | Sonehara et al. | ............. 710/62 |

FOREIGN PATENT DOCUMENTS

EP 0769740 A 4/1997

(Continued)

OTHER PUBLICATIONS

European Search Report mailed Mar. 30, 2004.

(Continued)

*Primary Examiner*—W. Thomson
*Assistant Examiner*—Van H. Nguyen
(74) *Attorney, Agent, or Firm*—Crowell & Moring LLP

(57) ABSTRACT

An information processing apparatus wherein a plurality of operating systems operate on a single processor and a framework (shared object) enabling reliable and quick sharing of correct information between the plurality of operating systems is provided. The apparatus has a function the plurality of operating systems can create, register and refer to the shared object which provides an interface for registration and reference of information. The shared object is operated so that, while one of the operating systems is registering information or referring thereto, the other operating system is inhibited from registering the information and referring thereto. When one operating system finished the registration or reference of the information, one operating system informs the other operating system of the fact.

13 Claims, 13 Drawing Sheets

FOREIGN PATENT DOCUMENTS

| | | |
|---|---|---|
| GB | 2 298 539 | 9/1996 |
| JP | 11-024943 | 1/1999 |
| JP | 11-149385 | 6/1999 |

OTHER PUBLICATIONS

*Virtual Computer Method*, OS seris, by Seio Okazaki, pp. 35-123, vol. 11, VM, Kyouritsu Publishing.

* cited by examiner

FIG. 11

341
| SEMAPHOARE ID 1 |
| SEMAPHOARE ID 2 |
| ... |
| SEMAPHOARE ID n |

340
| SHARED OBJ ID 1 |
| SHARED OBJ ID 2 |
| ... |
| SHARED OBJ ID n |

| 350 | 351 | 352 | 353 | 354 | 355 |
|---|---|---|---|---|---|
| LONGITUDE | LATITUDE | RECEIVE TIME | IDENTIFICATION ID | ADDITION ID | ADDITION INFORMATION |
| X1 | Y1 | 12:15 | D125 | OPEN | IN BARGAIN SALE |
| X2 | Y2 | 12:15 | P125 | OPEN | IN SPECIAL BARGAIN SALE |
| X4 | Y4 | 12:20 | D12 | OPEN | |
| X5 | Y5 | 12:20 | P32 | CLOSE | |
| X10 | Y10 | 13:10 | R56 | OPEN | |
| X11 | Y11 | 13:10 | R350 | CLOSE | |
| X12 | Y12 | 13:10 | D20 | OPEN | |
| X13 | Y13 | 13:15 | P135 | OPEN | |
| X14 | Y14 | 13:15 | P12 | OPEN | |
| | | | NULL | | |
| | | | NULL | | |

INFORMATION PROCESSING APPARATUS WITH MULTIPLE OPERATING SYSTEMS

BACKGROUND OF THE INVENTION

The present invention relates to a technique for sharing information between a plurality of operating systems in an information processing apparatus which can have the plurality of operating systems and can switchingly operate one of the operating systems.

In an ordinary information processing apparatus, a single operating system (OS) is operated to perform resource schedule management in such a manner that the apparatus can manage such resources such as a processor, a memory and input/output devices which form the information processing apparatus for efficient operation of the resources.

There are various types of operating systems which are excellent in operations such as user interface, multimedia, communications, etc. and excellent in real time processing. For the purpose of obtaining such features, there is a demand of a single processor which can execute a plurality of operating systems.

As a mechanism for operating a plurality of operating systems on a single processor, there is disclosed a virtual machine system (Volume. 11 in OS Series, VM, Kyouritsu Publishing, written by Seio Okazaki) which is implemented in a large scale computer. In the virtual machine system, a virtual machine control program occupies, manages and virtualizes all hardware to form a virtual machine. A controller forming a part of the virtual machine virtualizes a physical memory, input/output unit device, external interrupt, etc.

Meanwhile, as a technique for offering an interface of a plurality of operating systems with a single processor, a micro-kernel exists. In the case of the micro-kernel, an operating system server, which provides functions of the operating systems to a user, is formed on the micro-kernel. The user utilizes computer resources via the server. When a server is provided for each of the operating systems, the user can enjoy provision of various operating system environments.

In a car navigation, on the other hand, site information such as restaurant information is previously stored in a storage such as a CD-ROM or DVD-ROM so that the site information can be read out from such a storage and displayed on a map.

In an environment wherein a plurality of operating systems are operated on a single processor, the operating systems are operated autonomously each other so that application software or programs mounted to the respective operating systems are operated individually and asynchronously. Among the types of application programs operating on the operating systems, however, there may exist some application program which can realize its function by exchanging information with the other application program in synchronism with each other. In such a case, a mechanism is required by which the application program can share information on the respective operating systems or can be synchronized thereon. To this end, there are suggested a shared memory which provides a memory zone capable of being referred to by respective operating systems, and a message communication technique for realizing communication between respective operating systems.

When such a shared memory is used to share information between the plurality of operating systems for their cooperative operation, however, there occur problems which follow.

That is, while the application program on one of the operating systems is registering information in the shared memory, if an OS context change-over takes place to change the current operating system to another operating system, then the application program on the changed operating system refers to the incorrect information being rewritten in the shared memory.

Further, when the application program of one operating system registered information in the shared memory or changed information in the shared memory, the application program of another operating system cannot immediately recognize it. For example, even when the updating of the information is monitored through polling, the application program cannot recognize it in a time shorter than a polling interval time. In this case, in addition, periodical information updating must be judged, which results in an increased load of the processor.

Furthermore, in the case where a communication message is used to share information between a plurality of operating systems for their linkage operation, if the application programs of the respective operating systems do not know previously addresses of a shared memory having information to be shared or interface information such as task ID's of the respective application tasks, then there occurs a problem that information exchange is impossible.

When an environment, wherein a plurality of operating systems are operated on a single processor, is applied to a position information display device such as a navigation device, it is required for the application program of each of the operating systems to perform its processing operation with use of the latest position information. For this reason, the display device is remarkably affected by the aforementioned problem.

In the prior art, further, when it is desired to newly add an application program utilizing information shared between a plurality of operating systems in an already-developed system environment, the newly-added application program requires modification of existing application programs, with the result that the number of developing steps and a development period are increased.

SUMMARY OF THE INVENTION

In view of the aforementioned circumstances, it is therefore an object of the present invention to provide a framework (shared object) which can be reliably shared between a plurality of operating systems in an information processing apparatus wherein the plurality of operating systems are operated on a single processor. Another object of the present invention is to provide a framework by which information can be quickly exchanged between a plurality of operating systems.

A second problem is one associated with a navigation device. In a prior art car navigation apparatus, site information is held in a fixed storage medium such as a CD-ROM or a DVD-ROM. For this reason, it has been impossible to obtain the information on a real time basis. Further, even when it is tried to provide such information by broadcasting, it is difficult due to the restriction of its broadcasting band to provide all information relating to the site information.

In order to solve the above problem, in accordance with the present invention, there is provided an information processing apparatus which has a plurality of operating systems mounted therein and which has an OS switching function of operating one of the operating systems by switching between the operating systems. And the information processing apparatus further has a sharing function that shared information, registered by one of the plurality of operating systems in a memory resource capable of being referred to by the plurality of operating systems, can be referred to by an application program of another operating system.

And while the application program of one operating system is registering the site information in the memory resource or referring thereto, the sharing function inhibits another operating system from registering site information in the memory resource or referring thereto. As a result, correct information (rather than incorrect information being rewritten by the application program of one operating system) can be reliably shared between the plurality of operating systems.

Or the sharing function, when the application program of one operating system registered site information in the memory resource or referred thereto, can inform the other operating systems of the fact that the site information was registered in the memory resource or referred thereto. As a result, information can be quickly exchanged between the plurality of operating systems.

For the purpose of solving the second problem, site information is broadcast on a real time basis. A signal receiving terminal has a broadcast receiving means for receiving information being broadcast and also has a broadcast information display means for displaying as overlapped the broadcast information as a figure at the corresponding position on a map on the basis of the position and identification information in the broadcast information. Thus the user of a car navigation can display site information on a real time basis on the car navigation as the signal receiving terminal. Further, the broadcast information also include information relating to a detailed information storage device such as a network address of the storage device. On the receiver terminal side, when the user selects site information displayed as a figure on the map, a means for identifying the detailed information storage device identifies a storage device corresponding to information relating to one of displayed figures selected by the user on the basis of information on the detailed information storage device being broadcast. Thereafter, the detailed information associated with the site information specified by the user can be received from the identified storage device via a communication means and be displayed on a detailed-information display unit. In this manner, by broadcasting only basic parts (position, identifier, information about a storage device) of the site information, the user can accept information associated with the site information via communication.

BRIEF DESCRIPTION OF THE DRAWINGS

FIG. 11 shows an exemplary arrangement of the shared object built in the car navigation apparatus explained in FIG. 10;

DESCRIPTION OF THE EMBODIMENTS

Explanation will be made by referring to the attached drawings as to a first embodiment of the present invention wherein an information processing apparatus, which has a plurality of operating systems (OS's) and has an OS switching function of switching to one of the plurality of OS's to operate the switched OS on a single processor, is applied to a car navigation apparatus as an example.

Figure 1:
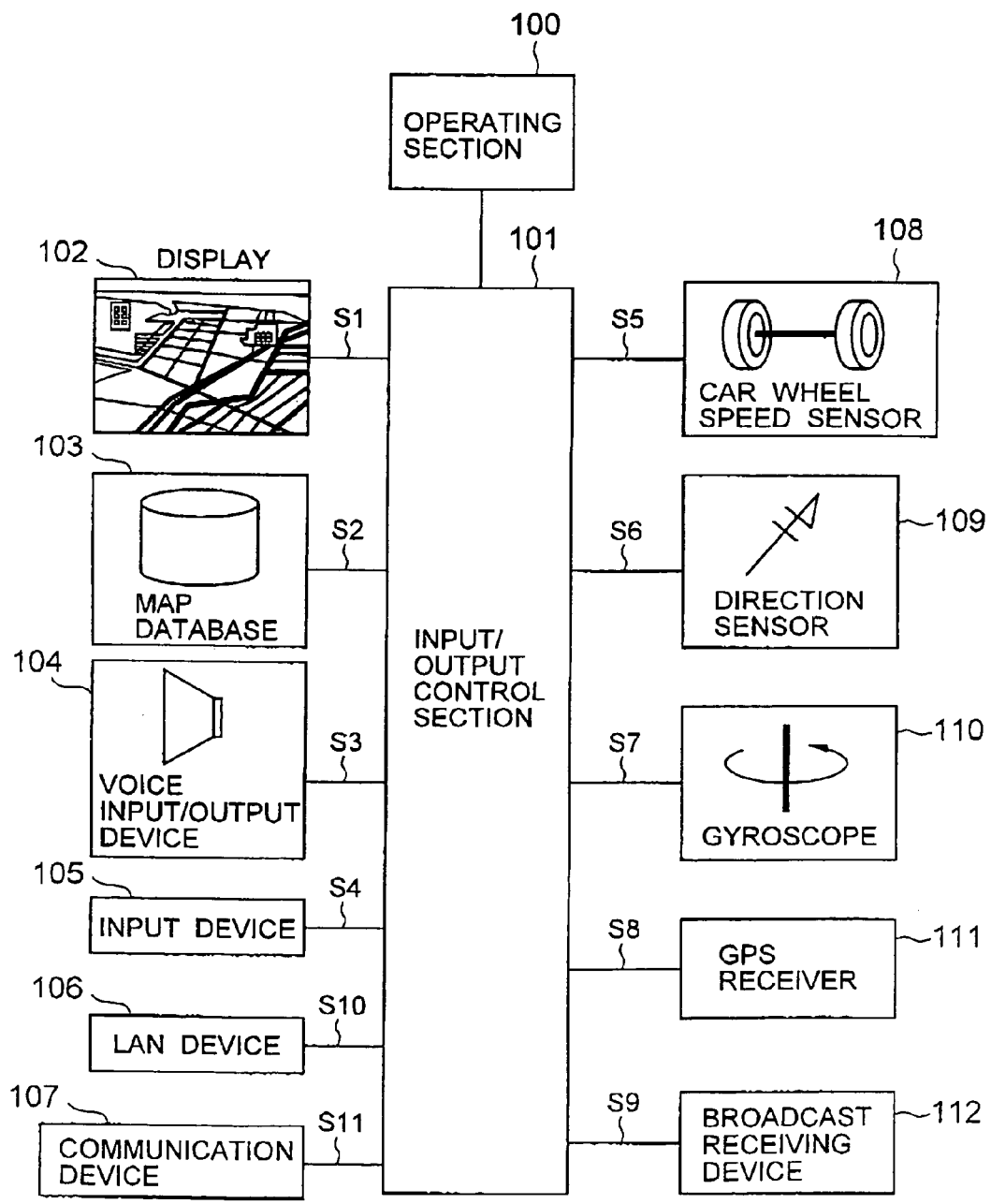
FIG. 1 is a functional block diagram of a navigation device mounted on a car, to which the present invention is applied as a first embodiment.

FIG. 1 is a functional block diagram of a car navigation apparatus to which the first embodiment of the present invention is applied.

In FIG. 1, an operating section 100 detects a current position on the basis of sensor information received from various sensors (car wheel speed sensor 108, a direction sensor 109, a gyroscope 110 and a GPS (global positioning system) receiver 111) for position measurement, and on the basis of the obtained information on the current position, reads out map mesh data necessary for map display from a map database 103. And the operating section graphically develops the read-out map mesh data and displays it on a display 102 as over-lapped with a mark indicative of the current position (current position display operation). The operating section 100 also searches for an optimum route connecting the current position and a target position instructed by the user, and displays the route on the map as overlapped with the map on the display 102 to guide the user to the target position (route guiding operation). The operating section also inquires dynamic information necessary for the user of an information service center (not shown) with use of a communication device 107, and displays the acquired dynamic information on the display 102 (dynamic information offering operation). The operating section 100 is a central unit which performs various operations including the aforementioned operations.

An input/output control section 101 is a unit which connects the operating section 100 and peripheral devices 102 to 112 and has I/O ports as interfaces with the peripheral devices 102 to 112, which will be explained later in detail in connection with FIG. 2.

The display 102 is a unit which displays thereon graphical information generated by the operating section 100 and which is provided in the form of a CRT or liquid crystal display. A signal S1 between the operating section 100 and display 102 is usually a RGB signal or NTSC (national television system committee) signal.

The map database 103 is a storage medium such as a CD-ROM, DVD-ROM, IC card or hard disc. Stored in the map database 103 are map mesh data, guide information, search information, etc. necessary for map display.

A voice input/output device 104, which is made up of a loudspeaker and a microphone, converts a message (e.g., guide voice) to the user generated by the operating section 100 in the route guiding operation into a voice signal and sounds it from the loudspeaker. The voice input/output device 104 also receives a voice issued from the user at the microphone, recognizes it as a voice, and sends its recognized result to the operating section 100. In this connection, the voice input/output device 104 may have a function of only converting a voice signal accepted by the microphone into a digital signal, and the voice recognition may be executed in the operating section 100.

An input device 105 is a unit which accepts an instruction from the user. The input device 105 is arranged to have a hard switch such as a scroll key or scale change key, a joystick, or a touch panel mounted on the display 102. In this case, however, the input device 105 may have a remote control which communicates with use of infrared ray.

A LAN device 106 is a device which performs two-way communication with various devices mounted on the car equipped with the navigation device. A car-mounted LAN, which generally varies from its application to application, is classified into information, control, electrical and diagnosis systems. The required transmission speed and quality of the car-mounted LAN's vary depending on their applications. For this reason, when a plurality of systems of LAN'S are employed, it is preferable that the LAN device 106 is arranged to be compatible with these LAN'S.

The communication device 107 is connected with a public line network or a private line network for two-way communication. The communication devices to be connected with the public line network include a portable telephone device or PHS (personal handyphone system). The communication devices to be connected with the private line network include an MCA transceiver. A device for DSRC (U.S. David Sarnoff Research Center) such as an ETC which is recently increasingly installed for toll collection of toll roads is also included in the communication device 107. Since the car navigation apparatus is connected to Internet via the communication device 107, a highly rich of latest contents can be captured within the car.

A broadcast receiving device 112 functions to receive broadcast waves radiated from a broadcast station installed on the ground or from a satellite. The broadcast waves are roughly separated into analog and digital broadcast signals. The contents of the received digital broadcast signal are decoded by the receiver and subjected to a filtering operation by the operating section 100 to extract necessary information therefrom.

In the case of the car navigation apparatus the car wheel speed sensor 108, direction sensor 109, gyroscope 110 and GPS receiver 111 are employed as sensors for detecting a position. The car wheel speed sensor 108 measures a distance from a product of the rotational speed and perimeter of the car wheel, and measures a turned angle of the car from a difference in rotational speed between a pair of wheels. The direction sensor 109 detects a magnetic field of the Earth itself to detect a direction to which the car is directed. The gyroscope 110 is a device such as a fiber gyroscope or a vibration gyroscope which detects an angle to which the car is turned. The GPS receiver 111 receives signals from 3 or more GPS satellites, and measures distances between the car and the respective GPS satellites and rates of changes therein to thereby find a current position, moving speed and moving direction of the car. In this connection, all of the above sensors are not necessarily required. That is, independent desired ones of the above sensors or combinations thereof may be employed as necessary.

Explanation will next be made as to the hardware configuration of the operating section 100 and input/output control section 101 in FIG. 1.

Figure 2:
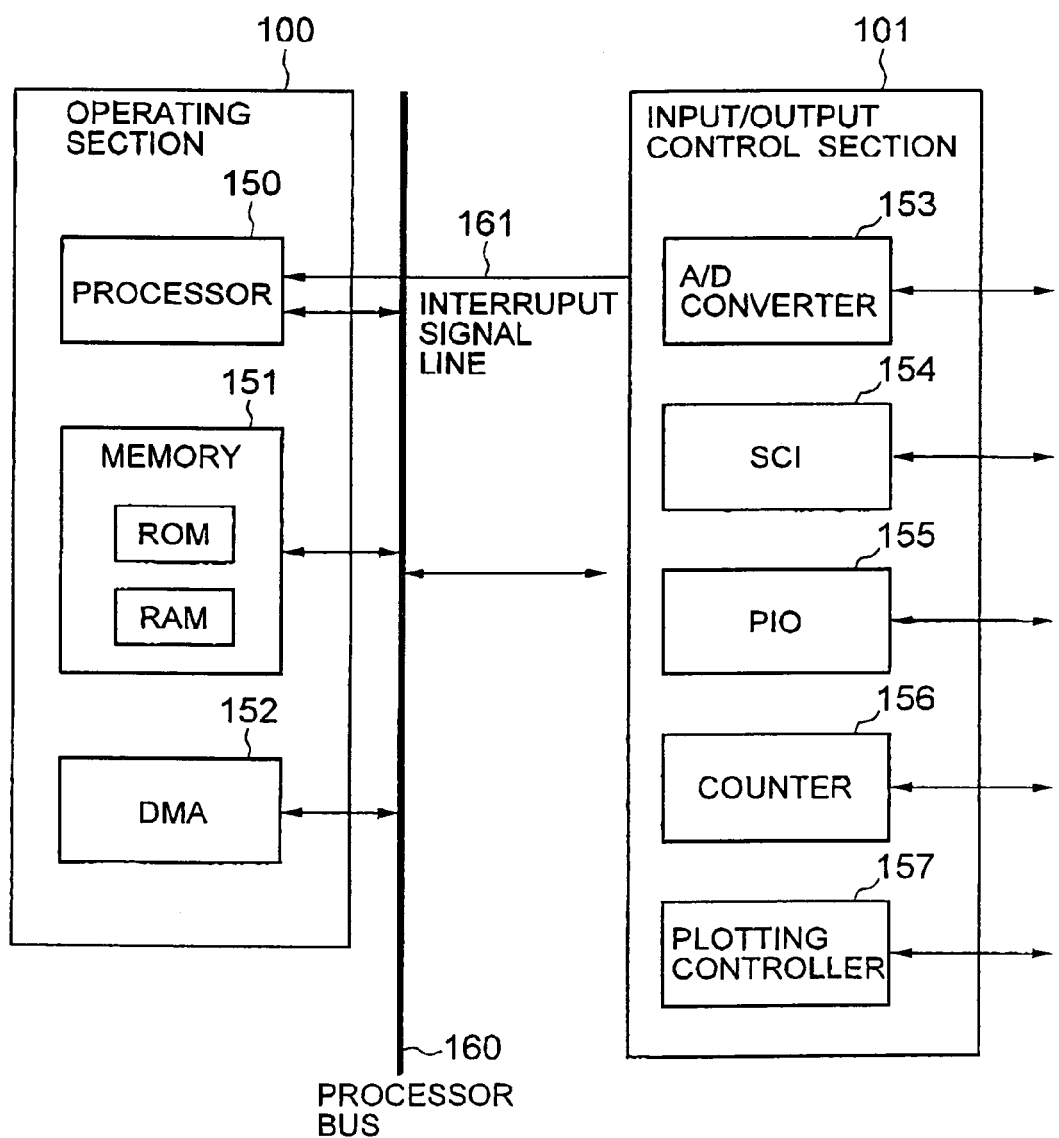
FIG. 2 shows a hardware configuration of an operating section 100 and an input/output control section 101 shown in FIG. 1.

FIG. 2 shows a hardware configuration of the operating section 100 and input/output control section 101 in FIG. 1.

The input/output control section 101 functions to connect the operating section 100 and peripheral devices 102 to 112, and for which purpose, has I/O ports as the interfaces with the peripheral devices 102 to 112, as already explained above. As illustrated, the I/O ports include an A/D converter 153, an SCI (serial communication interface) 154, a PIO (parallel input output) 155, a counter 156, and a plotting controller 157.

The A/D converter 153 converts an input analog signal into a digital signal. The SCI 154 converts a serial signal communicating in a time series manner at a predetermined communication speed into a parallel signal, or converts a parallel signal into a serial signal. The PIO 155 samples the parallel signal at predetermined timing. The counter 156 counts the number of pulses in a pulse signal inputted in every predetermined unit time by integrating the pulse signal. The plotting controller 157 converts plotting data to pixel information at a high speed and outputs a display signal to the display 102 at a predetermined bit rate.

As illustrated, the input/output control section 101 having such I/O ports is connected to the operating section 100 through a processor bus 160. Further, for the purpose of informing of completion of input/output operation, etc. to and from the peripheral devices 102 to 112, an interrupt signal line 161 is connected to the processor 150 of the operating section 100. Although the interrupt signal line 161 and processor bus 160 are illustrated as if they were provided independently of each other in FIG. 2, the interrupt signal line 161 actually forms a part of the processor bus 160.

The operating section 100, as illustrated, has the processor 150 for executing various operations including numerical computation and control of the devices, a memory 151 for storing therein data about map, search, operation, etc., and a procedure program, and a DMA (direct memory access) controller 152 for executing data transfer between memories and between the devices at a high speed.

Explanation will then be made as to a software configuration of the aforementioned car navigation apparatus.

Figure 3:
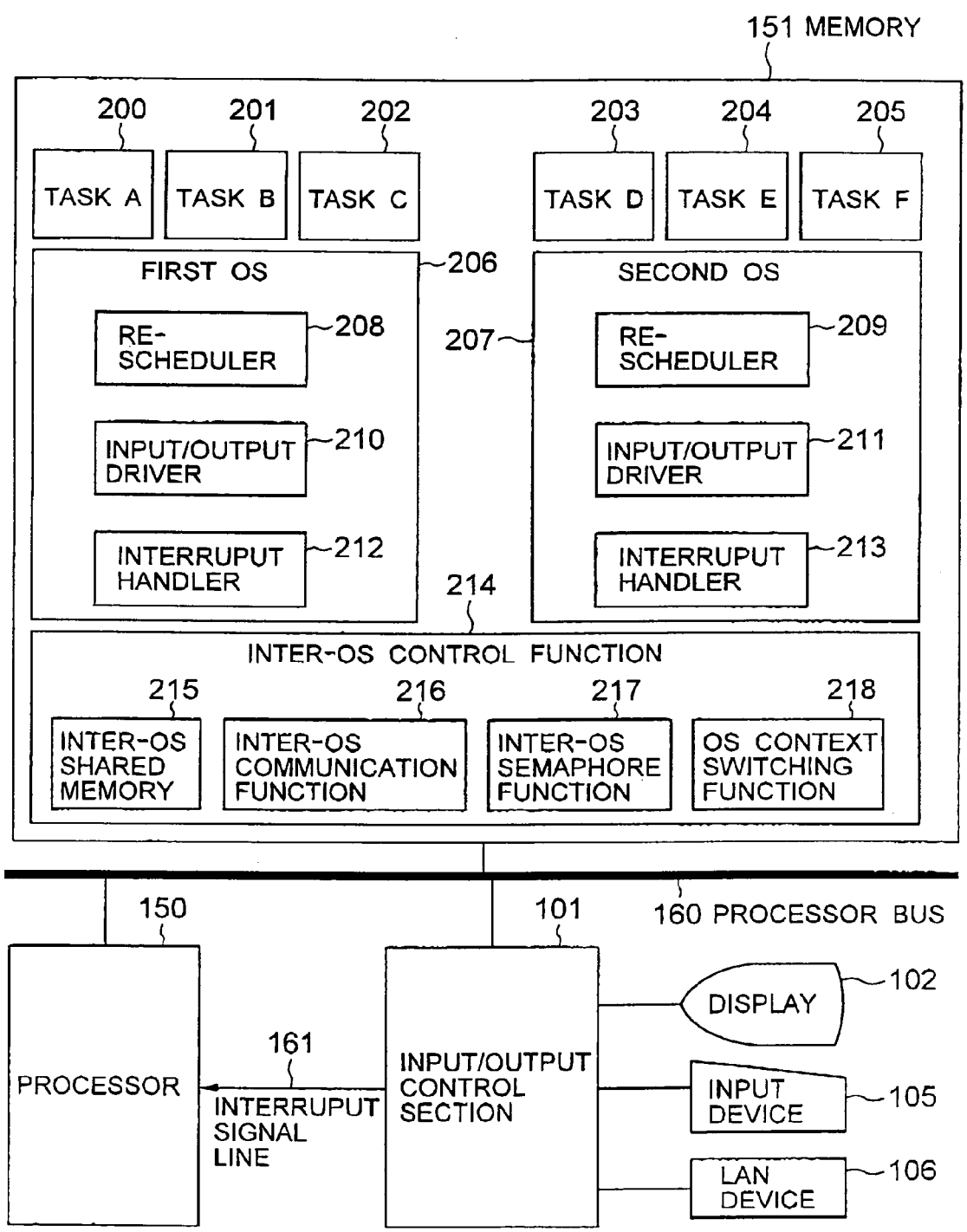
FIG. 3 shows a relationship between the hardware configuration of the car navigation apparatus shown in FIG. 2 and a software configuration.

FIG. 3 shows a relationship between hardware and software configurations of the car navigation apparatus of FIG. 2.

The memory 151 has an operating system program (first OS) 206, an operating system program (second OS) 207, task (application) programs (tasks A to C) 200 to 202 operating on the first OS 206, task (application) programs (tasks D to F) 203 to 205 operating on the second OS 207, and an inter-OS control function program 214. The first OS 206 has an input/output driver 210, an interrupt handler 212, and a re-scheduler 208. Similarly the second OS 207 has an input/output driver 211, an interrupt handler 213, and a re-scheduler 209.

The processor 150 is a microprocessor for operating a plurality of operating systems. The processor 150 reads out programs held in the memory 151. The processor 150 also has a function of masking an internal interrupt from an external interrupt informed by the interrupt signal line 161. In this case, the word 'interrupt masking or mask' as used in the above is a function of delaying input of a specific interrupt until the program releases the interrupt masking. Generally, there are three types of interrupt masking which follow.

(1) All interrupt masking: Masking all interrupts.
(2) Individual interrupt masking: Individually masking respective interrupt individually.
(3) Interrupt level masking: Setting levels for respective interrupts and masking ones of the interrupts having levels lower than a set level.

Most of such processors 150 have a function corresponding to a combination of the above types (1) and (2) or to a combination of the above types (1) and (3), depending on the types of the processors 150. When a processor having the function of the latter combination is employed, interrupt levels are allocated according to the importance of corresponding input/output devices or a minimum response time.

In the car navigation apparatus of the present embodiment, the two operating systems (first and second OS's 206 and 207) are operated concurrently. Each of the operating systems, using the memory and processor resources allocated to its own, executes the tasks (the tasks A 200 to C 202 for the first OS, while the tasks D 203 to F 205 for the second OS). The number of operating systems is 2 and the number of all tasks is 6 as an example in FIG. 3. However, these numbers may be used to be larger or smaller than the illustrated numbers.

The present embodiment is not intended to dynamically change the number of tasks on each operating system. However, it is possible for each operating system to dynamically generate or delete a task. Further, a combination of the first and second OS's 206 and 207 may be any type of combination. For example, it is possible as a matter of course that the second OS 207 is of a business processing type, while the second OS 207 is of a real time type.

It is assumed in the following explanation that, for the convenience of explanation, the second OS 207 is higher in priority level than the first OS 206. In this case, if the tasks D 203 to F 205 are being executed, then the second OS 207 uses the processor resource; whereas, if all the tasks D 203 to F 205 are in their idle or wait state, then the context is switched to the first OS 206 so that the first OS 206 uses the processor resource.

The inter-OS control function program 214 provides a mechanism (sharing function) of operating the first and second OS's 206 and 207 while associating the first OS 206 with the second OS 207 on the single processor 150. The inter-OS control function program 214 has a function of providing the inter-OS shared memory 215 accessible both by the first and second OS's 206 and 207, an inter-OS communication function 216 of realizing message transfer between first and second OS's 206 and 207, an inter-OS semaphore function 217 of realizing exclusive control and synchronization between the first and second OS's 206 and 207, and an OS context switching function 218 of realizing change-over in execution environment between the first and second OS's 206 and 207.

The shared memory 215 is intended to realize high-speed data transfer between a plurality of operating systems and can be read and written by both of the first and second OS's 206 and 207.

The inter-OS communication function 216 prepares message queues associated with the first and second OS's 206 and 207 for message transfer between the first and second OS's 206 and 207.

The inter-OS semaphore function 217 is used to realize exclusive control between the first and second OS's 206 and 207 with use of a binary-semaphore.

In this case, the shared memory 215, inter-OS communication function 216, inter-OS semaphore function 217 provide a framework which enables information sharing and exchange between the first and second OS's 206 and 207 in the present car navigation apparatus. The framework will be referred to as the shared object, hereinafter.

The OS context switching function 218 changes the context when judging the necessity of change-over of the operating system based on an interrupt request or a function call of the inter-OS control function program 214.

The interrupt handlers 212 and 213 possessed by the operating systems 206 and 207 accept interrupt requests from their input/output devices. The interrupt handlers 212 and 213 are called for each interrupt type and executes an interrupt handling program defined by the user.

The input/output drivers 210 and 211 possessed by the operating systems 206 and 207 process data input and output between the input and output devices. The input/output drivers 210 and 211 provide interfaces for control of the input and output devices from each task (the tasks A 200 to C 202 for the input/output driver 210, and the tasks D 203 to F 205 for the input/output driver 211).

The re-schedulers 208 and 209 possessed by the operating systems 206 and 207 are initiated when generation, deletion, stoppage or resumption of the tasks (the tasks A 200 to C 202 for the re-scheduler 208, or the tasks D 203 to F 205 for the re-scheduler 209) or an external or external interrupt requires the task change. The re-schedulers 208 and 209 store the task execution environment (program counter, status register, general register, etc.) being executed immediately before in a task management table, determine tasks to be newly executed, extract the execution environment of the task from the task management table, and set it in the respective registers to execute the selected task.

Explanation will next be made as to the internal structure of the processor 150 shown in FIG. 2.

Figure 4:
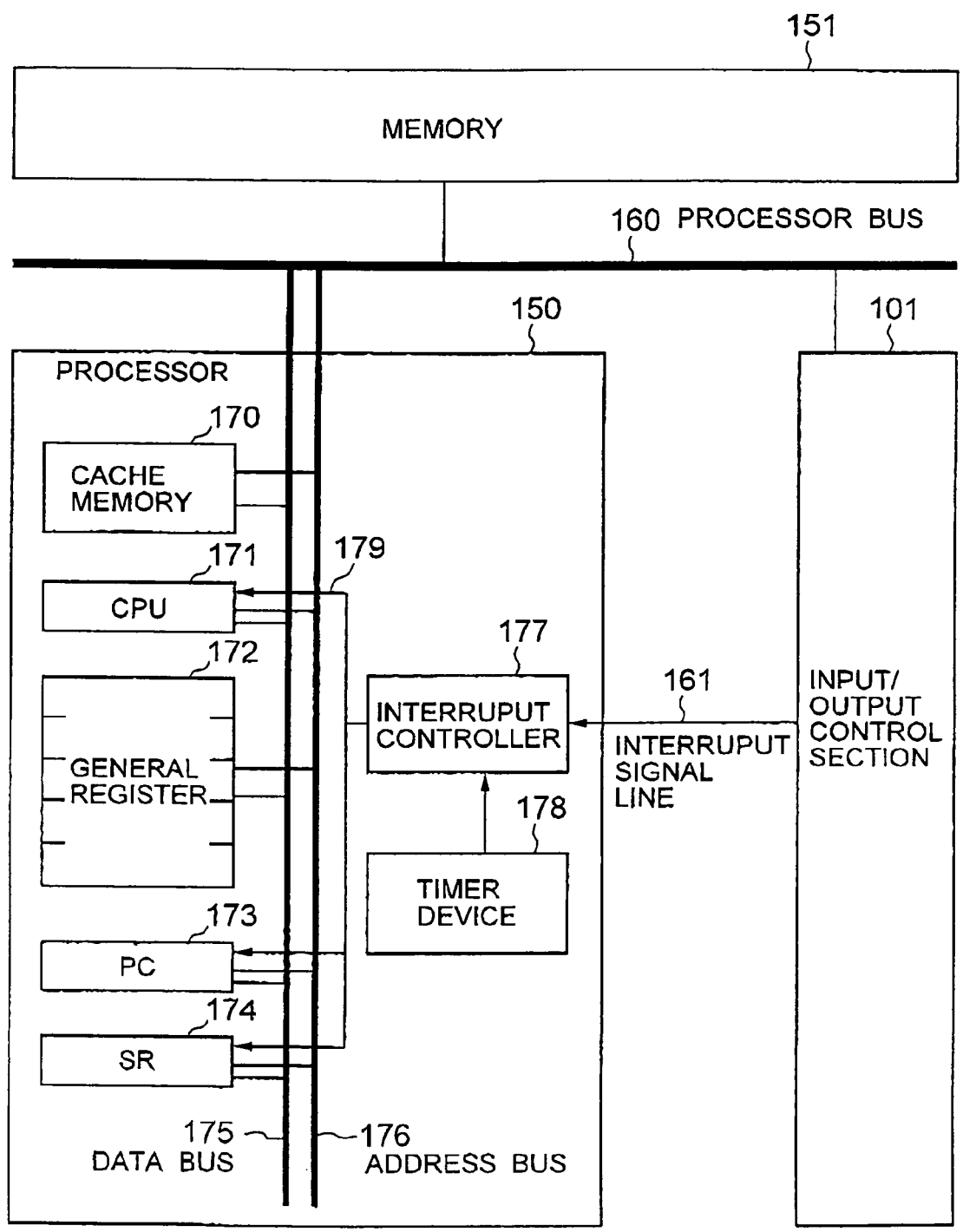
FIG. 4 shows an exemplary internal structure of a processor 150 in FIG. 2.

FIG. 4 shows an exemplary internal structure of the processor 150 in FIG. 2.

A cache memory 170 is a buffer memory which temporarily stores data or an instruction on the memory 151. A CPU 171 is an operating circuit which functions to sequentially read out and execute instructions present on the cache memory 170. For the execution of the instructions, there are used a general register 172 for temporarily storing an operated result, a program counter 173 for holding an execution instruction address, and a status register 174 for holding an execution status. The cache memory 170, CPU 171, general register 172, program counter 173 and status register 174 are mutually connected by a data bus 175 for data transfer and by an address bus 176 for addressing.

The interrupt signal line 161 and a timer 178 are connected to an interrupt controller 177. The interrupt controller 177 plays a role of generating an interrupt state signal 179 to the CPU 171. The interrupt state signal 179 indicates what type of interrupt currently takes place to the CPU 171. Usually, the status register 174 has information relating to the current interrupt masking and, on the basis of the information, the interrupt controller 177 determines whether or not to accept the interrupt specified by the interrupt state signal 179. When determining to accept the interrupt, the interrupt controller 177 rewrites the values of the program counter 173, status register 174, etc. to execute the corresponding interrupt handling program.

Explanation will then be made as to the shared object which enables sharing and exchange of information between the first and second OS's 206 and 207 in the car navigation apparatus of the aforementioned arrangement.

Figure 5:
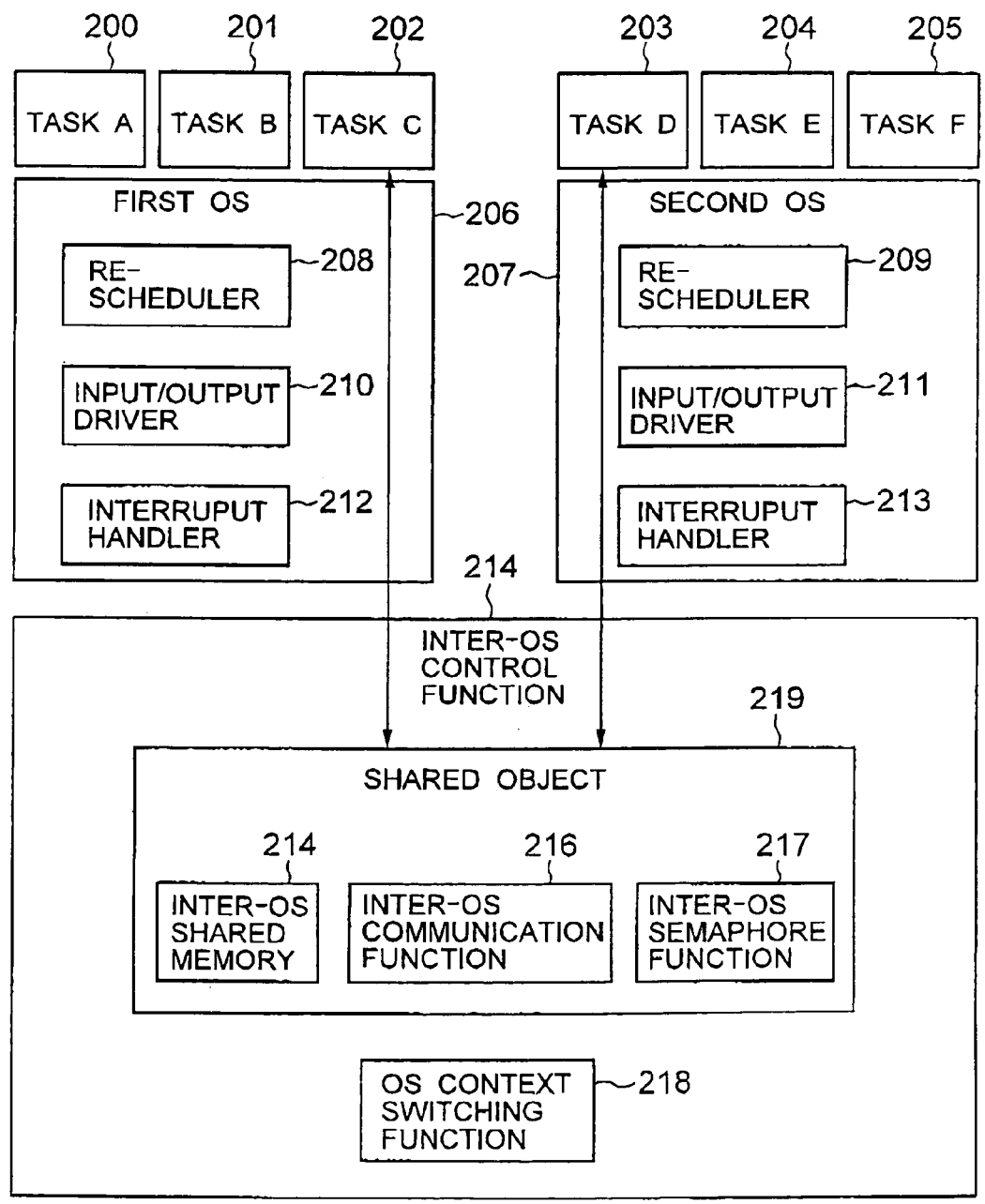
FIG. 5 is a diagram for explaining a shared object which enables sharing and exchange of information between first and second OS's 207 in the car navigation apparatus to which the first embodiment of the present invention is applied.

FIG. 5 is a diagram for explaining the shared object which enables sharing and exchange of information between the first and second OS's 206 and 207 in the car navigation apparatus, to which the first embodiment of the present invention is applied.

In FIG. 5, the shared object 219 executes the exclusive control or synchronization of information to be shared by all the tasks from the tasks A 200 to F 205 operating on the first and second OS's 206 and 207. Information to be managed by the shared object 219 in the car navigation apparatus include, for example, positional information to be managed by each node such as the current position, target position route of an automatic vehicle, position information to be managed by each link such as traffic jam information or route information to a predetermined point, and static or dynamic information attached to these position information. In this case, the word 'static information' means information such as facility title or service contents, that is not changed with time. The word 'dynamic information' means information such as business hours or parked status information of parking lot, that is changed with time. In this connection, information to be managed by the shared object 219 are not limited to the aforementioned specific information. In other words, information to be shared by all the tasks operating on a plurality of operating systems are determined by the applications (purposes) of these tasks or by the application of the information processing apparatus, and the shared object 219 can manage various types of information to be shared by all the tasks operating on the plurality of operating systems.

Meanwhile, when the first and second OS's 206 and 207 refer to the shared memory 215, there occur problems which follow.

Firstly, for example, during registration of information in the inter-OS shared memory 215 from a task being executed on the first OS 206, when an OS context change-over takes place and a task being executed on the second OS 207 tries to refer to the information, imperfect (incorrect) information may unfavorably be referred to in the information registration.

Secondly, for example, even when a task being executed on the first OS 206 tries to register information in the inter-OS shared memory 215, a task being executed on the second OS 207 cannot immediately recognize the fact.

Thirdly, further, in the case where a function of registering information in the inter-OS shared memory 215 and referring thereto is provided to each of application programs (tasks) operating on a plurality of operating systems, when it is desired to share new information between the plurality of operating systems, the application programs are required to be modified, resulting disadvantageously in an increased number of developing steps and an increased developing time period.

In order to avoid this, in accordance with the present embodiment, the shared object 219 which manages information to be shared by the plurality of operating systems is independently separated from the respective application programs operating on the operating systems. And since such a function that the respective operating systems can exclusively access the inter-OS shared memory 215 is provided to the shared object 219, it can be avoided that information being rewritten by the application program being executed on one of the operating systems is undesirably referred to by another operating system. Further, since a function of informing the application program on the other operating system of the fact that the application program on one operating system registered the information in the inter-OS shared memory 215 and referred thereto is provided to the shared object 219, quick information exchange can be realized between the operating systems.

These functions can be implemented by the tasks A 200 to F 205 operating on the first and second OS's 206 and 207 which calls from the shared object 219 the inter-OS shared memory 215, inter-OS communication function 216 and inter-OS semaphore function 217 in a combination therebetween.

As interfaces through which the tasks (application programs) A 200 to F 205 operating on the first and second OS's 206 and 207 make access to the shared object 219, there are provided application program interfaces (API's) such as registration, reference, creation and deletion of the shared object 219. In order to realize access to each shared object 219, different API's are provided for the different shared objects 219, or are provided so as to discriminate the shared objects 219 by arguments to the API's.

The respective tasks A 200 to F 205 operating on the first and second OS's 206 and 207 make access to the shared object 219 with use of the common API. The creation, deletion, registration and reference of the shared object 219 will be explained by referring to FIGS. 6 to 8.

Explanation will first be made as to the creation of the shared object 219.

Figure 6:
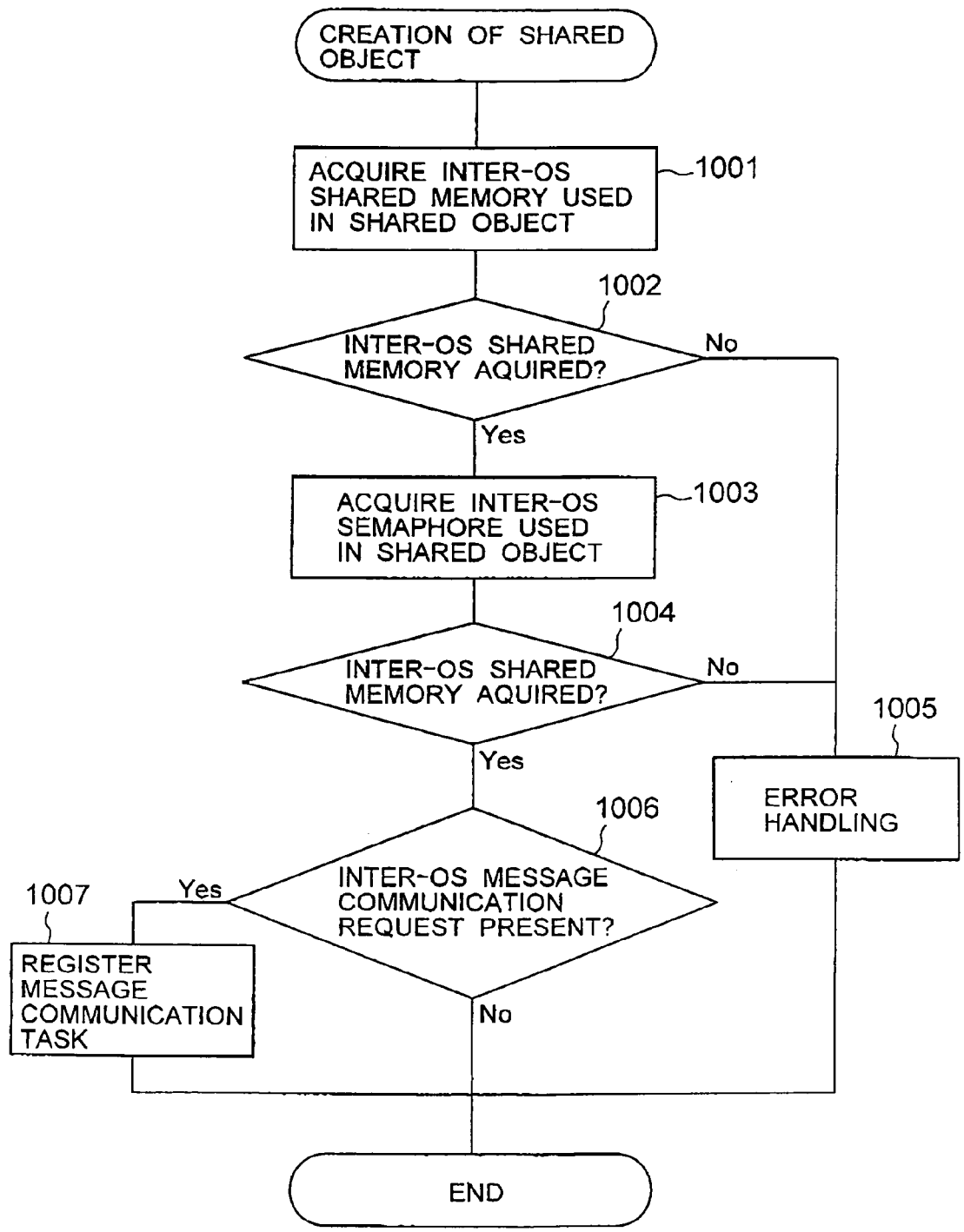
FIG. 6 is a flowchart showing operations of tasks A 200 to F 205 operating on the first and second OS's 206 and 207 when creating a shared object 219 with use of a common API (application program interface)

FIG. 6 is a flowchart showing the operations of the tasks A 200 to F 205 operating on the first and second OS's 206 and 207 when creating the shared object 219 with use of a common API.

In order to create the shared object 219, the tasks acquire an inter-OS shared memory to be used by the shared object on the basis of the attribute of the shared object and a necessary memory capacity (step 1001). In this case, the inter-OS shared memory is obtained by searching for a unused zone in a memory space allocated as the shared memory of the first and second OS's 206 and 207 and allocating the unused memory zone to the shared object to be created. When the inter-OS shared memory cannot be acquired (NO in a step 1002) as when an empty memory space is insufficient, predetermined error handling operation (releasing of the acquired resources) is carried out (step 1005).

Next, when the tasks creating the shared object can acquire the inter-OS shared memory (YES in the step 1002), the tasks acquire an inter-OS semaphore for the tasks to manage exclusive access to the inter-OS shared memory (step 1003). The inter-OS semaphore used therein is a binary semaphore. Only one of the tasks on the plurality of operating systems can acquire the semaphore. When the task fails to acquire the inter-OS semaphore (NO in a step 1004), it performs the predetermined error handling operation (freeing or releasing of the acquired resources) (step 1005). In this connection, the word 'resources to be freed or released' refers to the inter-OS shared memory and the infer-OS semaphore. By freeing these resources, leakage of memory resources can be prevented.

Subsequently, when the task for creating the shared object succeeds to acquire the inter-OS semaphore (YES in the step 1004), it judges whether or not to send a message using the inter-OS message communication when registering information in the inter-OS shared memory or referring thereto (step 1006). The judging operation is carried out based on parameters inputted to the task at the time of creating the shared object, so that, when the task receives a message communication destination, it determines the presence of a communication request. When determining unnecessariness of the message transmission (NO in the step 1006), the task terminates its creating operation of the shared object.

When determining the necessity of the message transmission (YES in the step 1006), on the other hand, the task registers the task of the party to which the message to be transmitted through the inter-OS message communication when registering the information in the inter-OS shared memory or referring thereto (step 1007). The task to be registered here may be a single task or a plural tasks. Thereafter, the task competes its shared-object creating operation.

Explanation has been made in connection with the arrangement wherein the task of the party for the message to be transmitted is registered through the inter-OS message communication when the task registers the information in the inter-OS shared memory or refers thereto during the creation of the shared object in the foregoing. However, it is also possible to employ such an arrangement wherein a message notifying application program is set by the task which registers the information in the inter-OS shared memory or refers thereto. In this case, since the message notification destination can be freely set even after the creation of the shared object, an application program for information registration and reference can be newly added without modification of the existing application program.

Explanation will next be made as to the deleting operation of the shared object 219.

The deleting operation is carried out by the task for deleting the shared object 219 which frees the inter-OS shared memory and inter-OS semaphore being used by the shared object to be deleted.

Explanation will then be made as to how to register information in the inter-OS shared memory 215 of the shared object 219.

Figure 7:
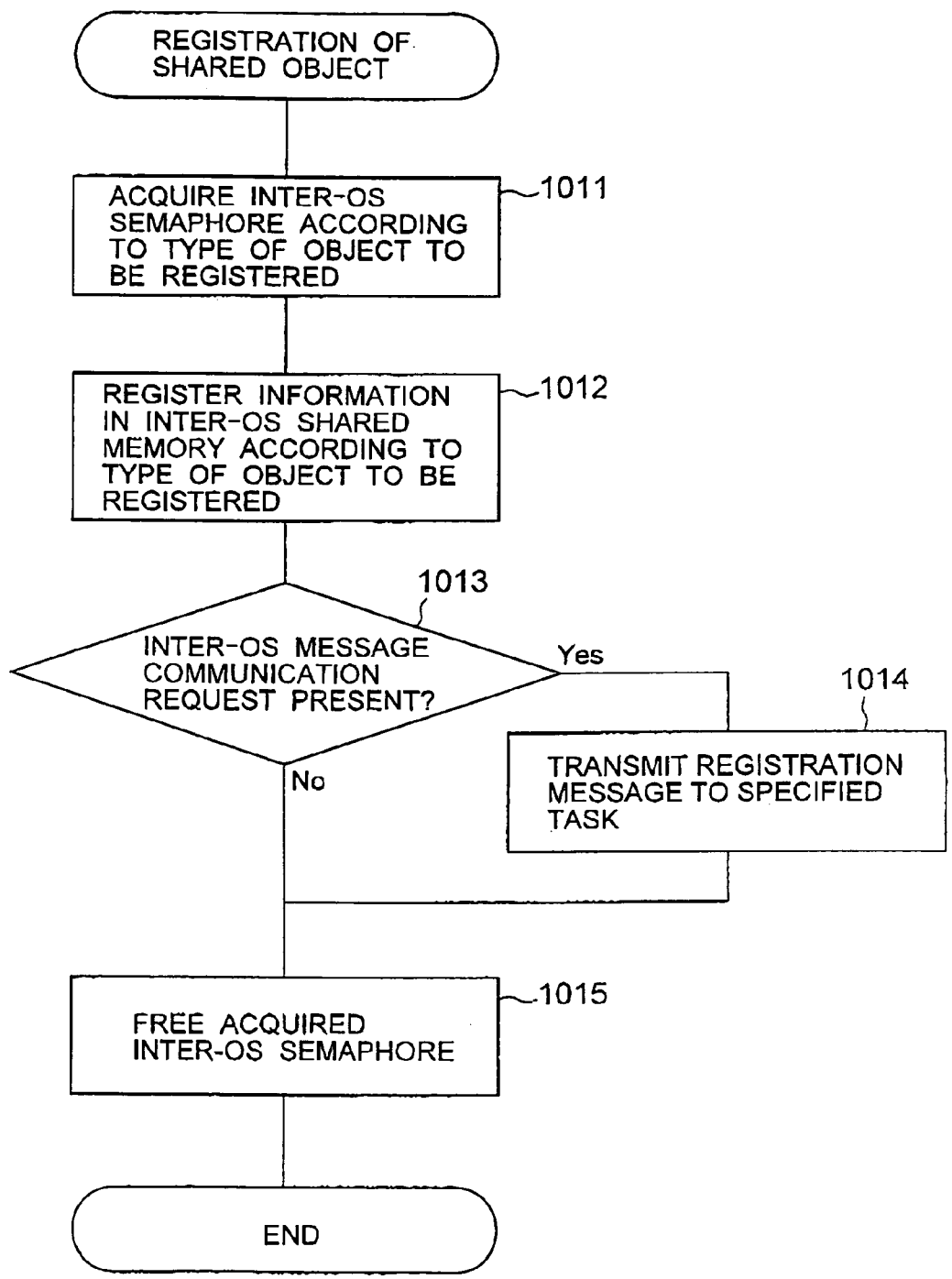
FIG. 7 is a flowchart showing operations of the tasks A 200 to F 205 operating on the first and second OS's when registering information in a shared memory 215 between the OS's in the shared object 219 with use of the common API.

FIG. 7 is a flowchart showing the operations of the tasks A 200 to F 205 operating on the first and second OS's 206 and 207 when the tasks register information in the inter-OS shared memory 215 of the shared object 219 with use of a common API.

The task for registering the information in the inter-OS shared memory of the shared object acquires a corresponding inter-OS semaphore according to the type of the shared object to be accessed (step 1011). The methods for acquiring the semaphore include a method for immediately returning a semaphore when the task cannot acquire the semaphore, a method for returning an error when the task cannot acquire a semaphore in a predetermined time, and a method for waiting permanently until the task can acquire a semaphore.

In this case, it is preferable to employ the method for returning an error when the task cannot acquire a semaphore in a predetermined time. When the task returns an error, the task competes its registering operation to the shared object.

Subsequently the task for registering information in the inter-OS shared memory of the shared object registers information to be registered in a memory space (inter-OS shared memory) determined according to the type of the shared object to be accessed (step 1012).

Next when the task to be message-communicated when the information was registered is already registered in the shared object being now subjected to the registering operation (YES in the step 1013), the task informs the already-registered task of the fact that the registration to the shared object was executed through the message communication (step 1014). When the task for registering the information in the inter-OS shared memory of the shared object is operating on the same operating system as the task as the message notification destination, the task uses the message communication of the operating system; whereas, when the task is operating on an operating system different therefrom, the task uses inter-OS message communication. Thereafter the step frees the inter-OS semaphore acquired in the step 1011 (step 1015) and completes its registering operation to the shared object.

When the task to be message-communicated when the information was registered is already registered in the shared object during the current registering operation (NO in the step 1013), the task immediately frees the inter-OS semaphore acquired in the step 1011 (step 1015) and completes its registering operation to the shared object.

Explanation will then be made as to how to refer to information in the inter-OS shared memory 215 of the shared object 219.

Figure 8:
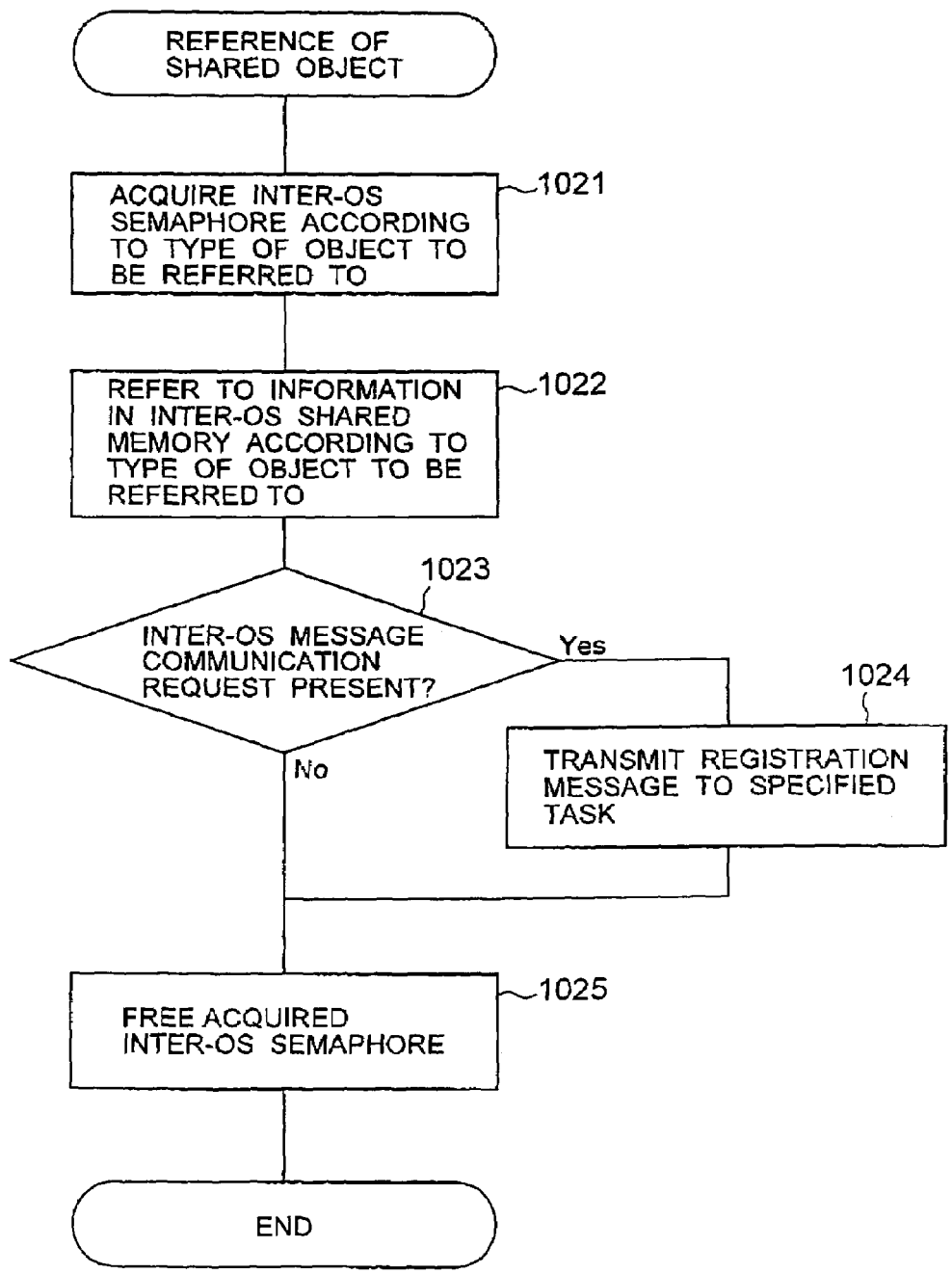
FIG. 8 is a flowchart showing operations of the tasks A 200 to F 205 operating on the first and second OS's 206 and 207 when referring to information registered in the shared memory 215 between the OS's of the shared object 219 with use of the common API.

FIG. 8 is a flowchart showing the operations of the tasks A 200 to F 205 operating on the first and second OS's 206 and 207 when the tasks refer to information registered in the inter-OS shared memory 215 of the shared object 219 using a common API.

The task for referring to information in the inter-OS shared memory of the shared object acquires a corresponding inter-OS semaphore according to the type of the shared object to be accessed (step 1021). The methods for acquiring a semaphore include a method for immediately returning an error when a task cannot acquire a semaphore, a method for returning an error when a task cannot acquire a semaphore in a predetermined time, and a method for permanently waiting for until a task can acquire a semaphore. In this case, it is preferable to employ the method for returning an error when the task cannot acquire a semaphore in a predetermined time. When the task returns an error, the task completes its referring operation to the shared object.

The task for referring to information in the inter-OS shared memory of the shared object refers to information registered in a memory space (inter-OS shared memory) determined according to the type of the shared object to be accessed (step 1022).

Subsequently, when the task to be message-communicated when the information was referred to is already registered in the shared object during the current referring operation (YES in the step 1023), the task informs the already-registered task of the fact that the reference of the shared object was executed through the message communication (step 1024). When the task for referring to information in the inter-OS shared memory of the shared object is operating on the same operating system as the task as the message notification destination, the task uses the message communication of the operating system; whereas, when the task is operating on an operating system different therefrom, the task uses the inter-OS message communication. Thereafter, the task frees the inter-OS semaphore acquired in the step 1021 (step 1025) and competes its referring operation to the shared object.

When the task to be message-communicated when the information reference was made is already registered in the shared object during the current referring operation (NO in the step 1023), the task immediately frees the inter-OS semaphore acquired in the step 1021 (step 1025), and completes its referring operation to the shared object.

Figure 9:
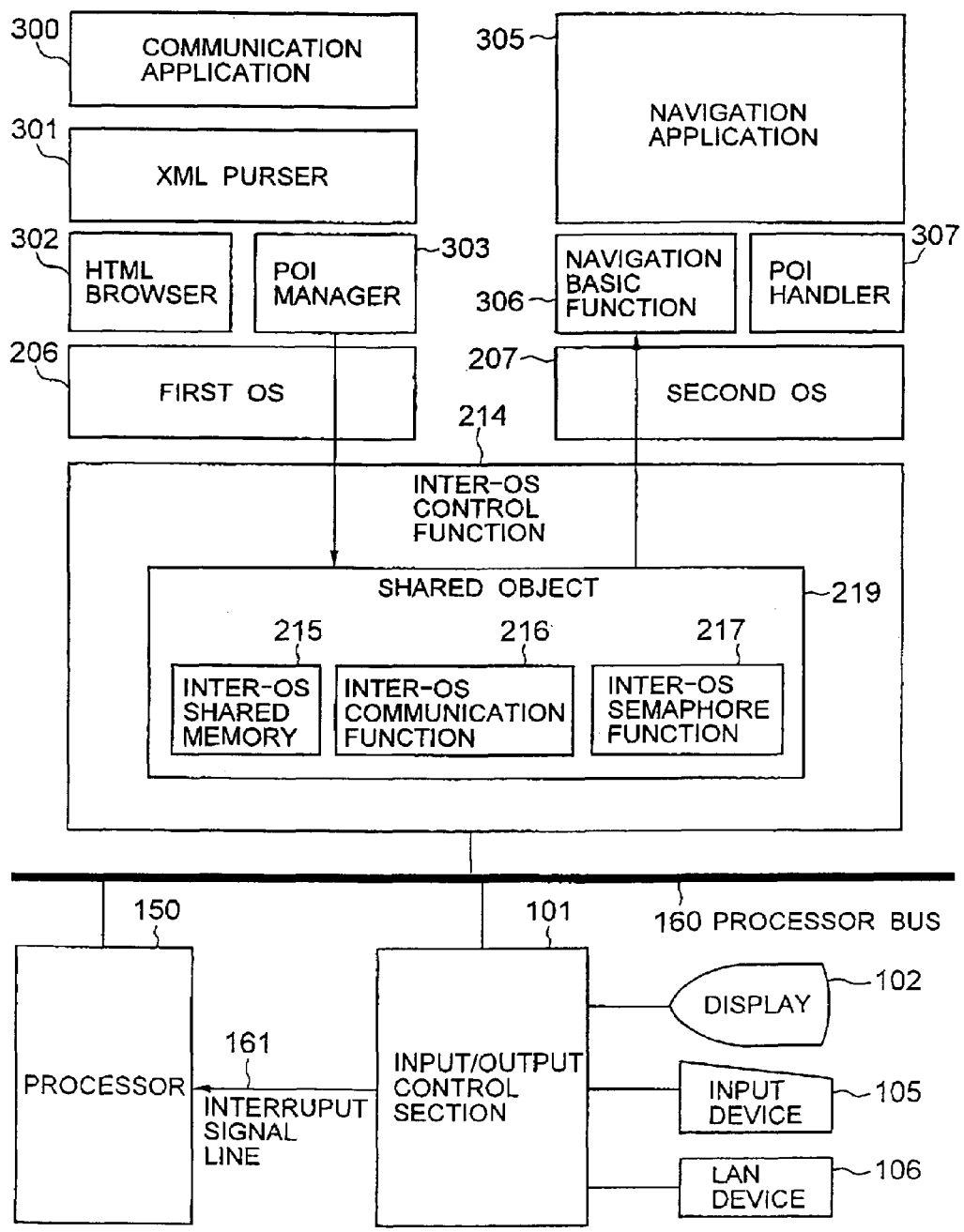
FIG. 9 shows a specific arrangement of the car navigation apparatus in which the shared object is built.

FIG. 9 shows a specific arrangement when the aforementioned shared object is built in a car navigation apparatus.

In this drawing, as an example, a communication application 300 is mounted as an application program for the first OS 206 while a navigation application 305 is mounted as an application program for the second OS 207. It is assumed that the first OS 206 is a general-purpose OS which can provide a general-purpose execution/development environment because it is desirable for the OS to be able to execute various communication applications; whereas, the second OS 207 is a real time OS because the OS executes an application program which requires real time processing as in car navigation.

The communication application 300, an XML purser 301, an HTML browser 302 and a POI manager 303 correspond to tasks on the first OS 206.

The communication application 300 is divided into two types, that is, a broadcasting application which receives a signal sent in one way from a satellite or a broadcasting station provided on the ground and a communication applications which communicates in two ways with use of a public line network such as a telephone line or mobile communication network. The communication application 300 used in the explanation of the present embodiment belong to the broadcasting application which receives a signal transmitted by broadcasting, decodes XML-described information from a stream of the receive signal, transmits the information to the XML purser 301.

The XML purser 301 analyzes the XML-described information with respect to tag, and separates the information into HTML-format information and facility information including position information called POI (point of interest). And the XML purser 301 transmits the HTML-format information to the HTML browser 302 while transmitting the position information to the POI manager 303. In this connection, the XML purser 301 can take care of not only HTML-format information but also information of various formats.

The HTML browser 302 analyzes the HTML-format information and displays information such as text or image on the display 102. The HTML-format information is a most common description format on Internet.

The POI manager 303 registers received POI information in the inter-OS shared memory 215 of the shared object 219 under control of the first OS 206. The POI information registered in the inter-OS shared memory 215 of the shared object 219 is referred to under control of the first OS 206. In this conjunction, the POI information registered in the shared object 219 include information about facility position and static or dynamic information associated therewith, road traffic-jam state information and recommendable route information. There are various methods of representing such road traffic jam state information and recommendable route information, including a method for representing it in the form of a row of arranged position information points or a method for representing it in the form of a linear link.

The navigation application 305, a navigation basic function and a POI handler 307 correspond to tasks on the second OS 207.

The navigation basic function 306 is a library which has a basic function necessary for the navigation device. The navigation basic function includes a map display function, a search function, an own-car position measuring function, a recommendable route searching function and a recommendable route guiding function.

The POI handler 307 refers to the POI information registered in the inter-OS shared memory 215 of the shared object 219 by the POI manager 303 under control of the second OS 207. The POI handler 307 also registers information necessary for the inter-OS shared memory 215 of the shared object 219 under control of the second OS 207.

The navigation application 305 analyzes the POI information and user operating information referred to by the POI handler 307, and calls the navigation basic function 306 to provide navigation information to the user through an output interface such as the display 102 or a loudspeaker.

Figure 10:
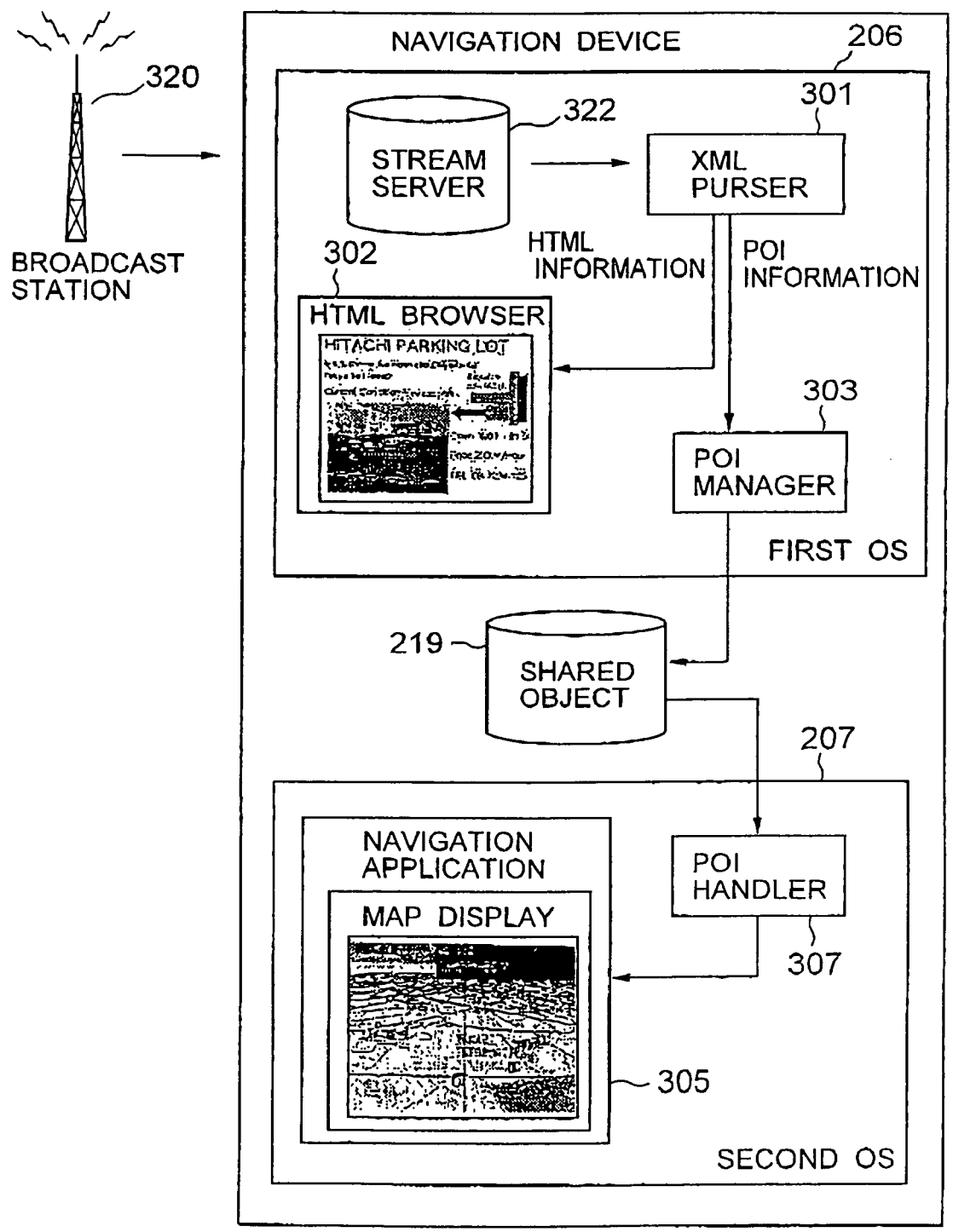
FIG. 10 is a diagram for explaining the operation of the car navigation apparatus of FIG. 9 when displaying received POI broadcast information on a map as overlapped therewith.

FIG. 10 is a diagram for explaining the operation of the car navigation apparatus of FIG. 9 when displaying POI information received by broadcasting as overlapped on a map.

As has been explained above, in the car navigation apparatus, to which the present embodiment is applied, two operating systems (first and second OS's 206 and 207) operate on the single processor 150. Further, the communication application 300 for receiving a broadcast signal and the navigation application 305 for displaying a map operate on the different operating systems. In this case, the POI information is displayed on the map as overlapped therewith in a manner, which will be explained below.

A broadcast station 320 broadcasts XML-described information of various contents including voice, moving picture and POI information. The car navigation apparatus receives the XML-described information broadcast from the broadcast station 320 for the sake of the convenience of explanation, but the device may receive the same information through a public line network.

The XML-described information received is once stored in a stream server 322. The stream server 322 may a memory which temporarily buffers broadcast waves or be a hard disc or a storage medium such as CD or DVD which can record it.

Information stored in the stream server 322 are separated into HTML-format information tag-analyzed by the XML purser 301 and POI information. And the HTML-format information is passed to the HTML browser 302 while the POI information is passed to the POI manager 303.

The HTML browser 302 analyzes the HTML-format information received from the XML purser 301 and displays information such as text or image on the display 102.

The POI manager 303 received from the XML purser 301 is registered in the inter-OS shared memory 215 of the shared object 219, by using the aforementioned registering function to the shared object already explained in connection with FIG. 7. The structure of the shared object 219 will be explained later.

In the shared object 219 for registration of the POI information, as earlier explained in FIG. 5, access to the shared object 219 by the other task is restricted during the registering or referring operation of one task. For this reason, it is avoided that the POI handler 307 refers to the same information during the information registering operation of the POI manager 303. It is also avoided that the CPU 202 updates the information during the information referring operation of the POI handler 307.

When one task registered information or referred thereto, it sends a message informing of the fact to the previously-registered task. It is arranged in the illustrated example that, when the POI information was registered in the shared object 219, the task transmits a message indicative of the fact to the navigation application 305. Accordingly when the POI manager 303 registers the POI information in the shared object 219, a message indicative of the fact is sent to the navigation application 305 in the form of an infer-OS message. For this reason, when the POI information is updated, the navigation application 305 can immediately refer to the POI information registered in the shared object 219 with use of the POI handler 307.

The navigation application 305, using the map display function in the navigation basic functions, displays a plan view map with a predetermined site point as its center or a bird's-eye view when viewed from above the site point. Now the shape of a symbol to be displayed is determined from an identification ID included in the POI information referred by the POI handler 307, and the form of the symbol such as color or flashing is determined from addition ID. In this case, the identification ID is information indicative of an attribute of a facility such as a restaurant or parking lot, and corresponds to static information included in the POI information. The addition ID is information indicative of, for example, whether or not a restaurant is in business hours or whether or not a parking lot has an unoccupied parking space, and corresponds to dynamic information included in the POI information. The symbols determined in this way is displayed on the map as overlapped therewith at a position determined based on the position information included in the POI information.

When the color of the symbol is changed according to the addition ID, different information (for example, about whether or not a restaurant is in business hours or whether or not a parking lot has an unoccupied parking space) can be presented to the user with use of different colors of the same symbol shape, thus improving its handleability. In this connection, when the displayed symbol is selected by the user through his manual input operation, the navigation application 305 may be operated so as to display its detailed information included in the POI information in another window or the like.

In this way, in an environment wherein a plurality of operating systems operate on a single processor, introduction of the shared object 219 enables cooperative operation of the respective application programs mounted for the respective operating systems while the respective operating systems perform their own operations as specialties.

Thus, as mentioned above, there can be provided a navigation device having a good handleability which can display the POI information acquired by the communication application 300 based on the first OS 206 as a general-purpose OS on a map displayed as overlapped therewith by the navigation application 305 based on the second OS 207 as a real time OS.

FIG. 11 shows an example of structure of the shared object mounted in the navigation device explained in FIG. 10.

Though various types of data structure of the shared object may be considered, but explanation will be directed in this case to a case where shared objects are independently stored for respective types.

Shared objects (OBJ) 340 of the respective types have semaphores 341 associated therewith in a 1:1 relationship. The semaphore 341 is used when the task makes access exclusively to the shared OBJ 340 corresponding to the semaphore 341.

Numerals 350 to 355 in the drawing denote POI information registered in the shared OBJ's 340 for the IDn. The POI information registered in the shared OBJ 340 include longitude 350 and latitude 351 indicative of a POI information, time 352 at which the POI information was received, identification ID 353 indicative of the facility of the POI, addition ID 354 indicative of the additional information of the POI expressed in the form of an ID code, and addition information 355 indicative of the additional information of the POI expressed in the form of a character string. In this connection, the position of the POI may be represented, in addition to the expression of it in the form of the illustrated latitude and longitude, in the form of a mesh ID of map data or normalized X and Y coordinate values in the mesh.

However, the data structure of the shared objects shown in FIG. 11 is illustrated merely as an example. Therefore, various types of data structure of the shared objects may be considered. For example, as will be explained later in connection with FIG. 12, when the user selects a symbol or site point on a map displayed on the navigation device and information relating to a position corresponding to the selected symbol or site point is available from the information service center, the POI information stored in the shared OBJ 340 is expressed in the form of latitude and longitude indicative of the position corresponding to the selected symbol or site point or in the form of an identification ID of the symbol when selected.

Figure 12:
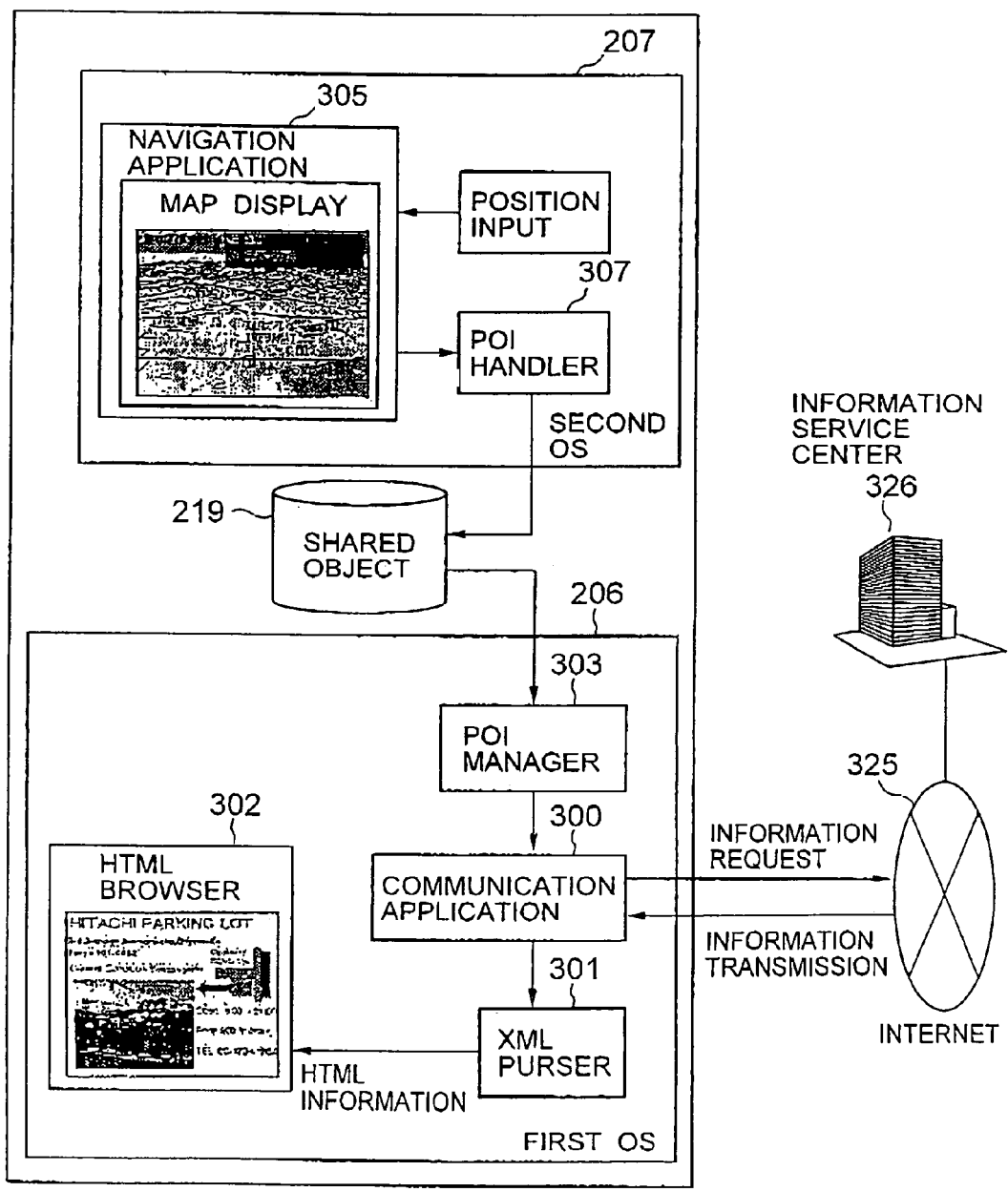
FIG. 12 is a diagram for explaining the operation of the car navigation apparatus of FIG. 9 when a user selects a symbol displayed as overlapped on the map or a site on the map and when the device acquires information corresponding to the selected symbol or site position from an information service center.

FIG. 12 is a diagram for explaining the operation of the car navigation apparatus of FIG. 9 when the user selects a symbol displayed as overlapped with a map or a site position on the map and when the device correspondingly gets information of a position corresponding to the selected symbol or site point from the information service center.

The navigation application 305, using a map display function in the navigation basic functions, displays a plan view map with a predetermined site point as its center or a bird's-eye view map when viewed from above the site point. Further, the navigation application, using a search function in the navigation basic function, selects information on a predetermined facility on the basis of facility information present in the map display area being now displayed and displays the selected facility information with its symbol overlapped with the map. In this case, since the search function can search only a storage medium mounted in the car navigation apparatus for the information, the navigation application cannot display such dynamic information that varies with time or such a massive amount of information that cannot be stored in the above storage medium. To avoid this, the car navigation apparatus demands information of an information service center 326 connected to a network such as Internet 325, and presents the obtained information to the user by outputting the information onto the display 102 or issuing it from a loudspeaker.

As has been explained above, in the car navigation apparatus, to which the present embodiment is applied, two operating systems (first and second OS's 206 and 207) operate on the single processor 150. Further, the communication application 300 for communicating with the Internet 325 and the navigation application 305 for displaying a map operate On the different operating systems. Thus the car navigation apparatus gets and displays information relating to a position corresponding to a symbol or site point selected by the user on a map from the information service center, in such a manner as to be explained below.

First of all, the navigation application 305, using a map display function in the navigation basic functions, displays a plan view map with a predetermined site point as its center or a bird's-eye view map as viewed from above the site point, and accepts the symbol or site point displayed on the map and selected by the user through the input device 105 or voice input/output device 104. And the navigation application detects POI information such as position information indicative of the selected site point or symbols and identification ID.

The POI handler 307, using the registration function to the shared object earlier explained in connection with FIG. 7, registers the POI information detected by the navigation application 305 in the shared object 219. The shared object 219 transmits an inter-OS communication message indicative of the fact that the POI information was registered to the communication application 300 previously registered as a transmission destination of the message. In response to the message, the communication application 300 makes access to the shared object 219 via the POI manager 303 to read out the POI information registered therein.

The communication application 300 then communicates with the information service center 326 via a network such as the Internet 325 and transmits an information request to the information service center 326. The information service center 326, when receiving the request, analyzes the contents of the request and transmits response information corresponding to the request to the communication application 300.

For example, the communication application 300 transmits to the information service center 326 the position information or identification ID included in the POI information referred to by the POI manager 303. And the communication application accepts information corresponding to the transmitted position information or identification ID from the information service center 326 in the form of an HTML format, and then sent to the HTML browser 302.

Or the communication application 300, on the basis of the position information or identification ID included in the POI information referred to by the POI manager 303, searches a server which offers the information to be referred to for the address of the server. And the communication application, using the searched address information, makes access to the server and sends request information thereto. Then the communication application accepts an HTML-format file from the server and sent it to the HTML browser 302.

Alternatively, when the network address of a server which offers information to be referred to is present in the broadcast POI information, the communication application 300, using the network address information of the server included in the POI information referred to by the POI manager 303, makes access to the server having the address, and transmits request information thereto. The communication application then accepts an HTML-formatted file from the server and sent to the HTML browser 302.

The HTML browser 302 analyzes the HTML-format file accepted from the communication application 300, and displays information such as text or image on the display 102.

In this way, in an environment wherein a plurality of operating systems operate on a single processor, introduction of the shared object 219 enable cooperative operation of application programs mounted to the respective operating systems while the respective operating systems perform their operations as specialties.

For this reason, as mentioned above, there can be provided a car navigation apparatus with a good handleability wherein the communication application 300 on the first OS 206 as the general-purpose OS can get from the information service center 326 positional information about a position on the map corresponding to the symbol or site point selected by the user in the navigation application 305 operating on the second OS 207 as the real time OS, and displays it.

Figure 13:
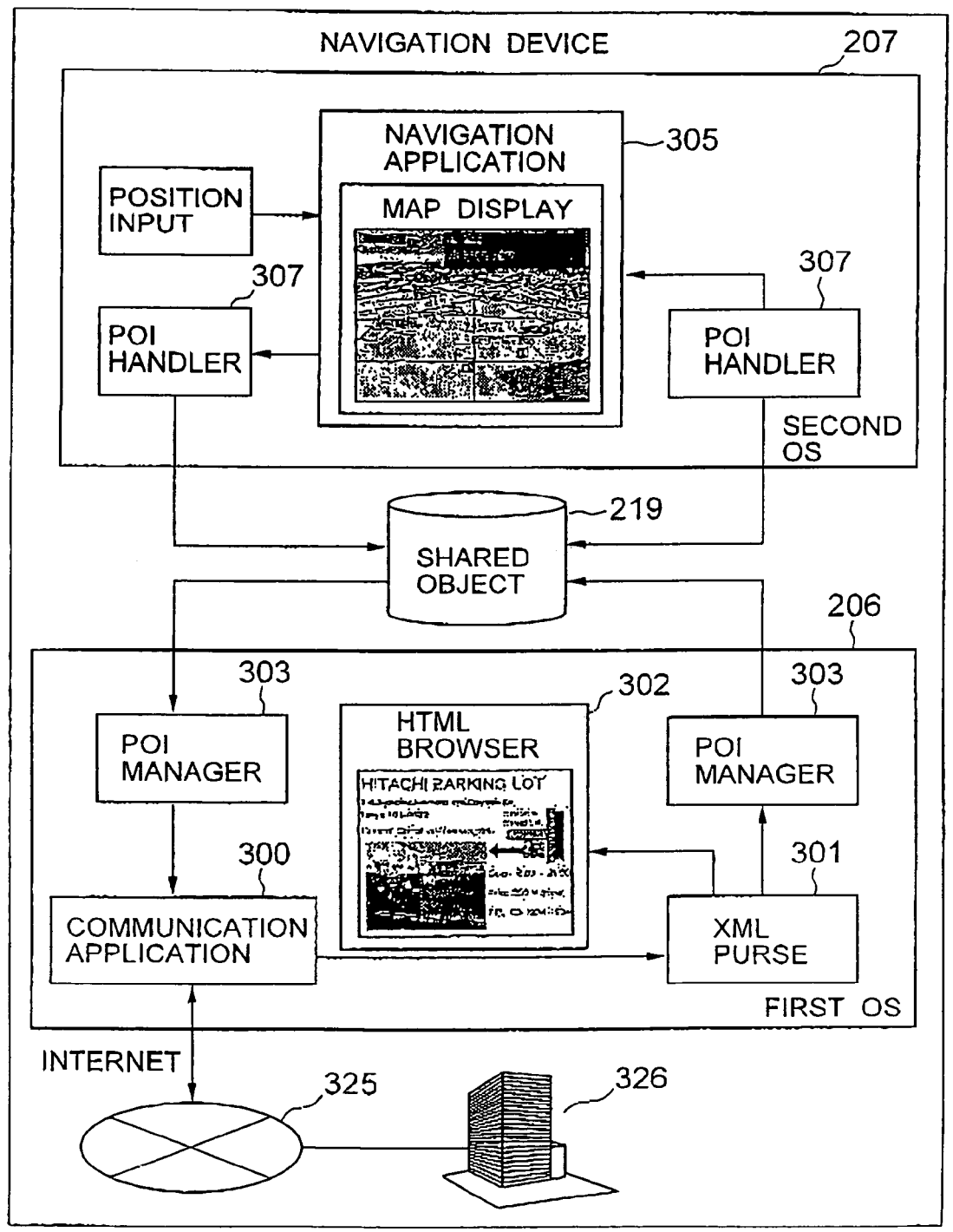
FIG. 13 is a diagram for explaining the operation of the car navigation apparatus of FIG. 9 when a user selects a symbol displayed as overlapped on the map or a site on the map and when the device acquires information corresponding to the selected symbol or site position from an information service center and displays the acquired information on the map as overlapped on the map.

FIG. 13 is a diagram for explaining the operation of the car navigation apparatus of FIG. 9, when a user selects a symbol displayed on a map as overlapped therewith or a site point on the map, and when the device gets information corresponding to the selected symbol or site point from an information service center and displays the information on the map as overlapped therewith.

In other words, the operation of FIG. 13 corresponds to a combination of the explained operation of FIG. 12 of the car navigation apparatus, when the symbol on the map as overlapped therewith or the site point on the map is selected by the user and when the device gets from the information service center the information corresponding to the selected symbol or site point and displays it as well as the aforementioned operation of FIG. 10 of the car navigation apparatus when displaying the received information as overlapped with the map.

First of all, the navigation application 305, using a map display function in the navigation basic functions, displays a plan view map with a predetermined site point as its center or a bird's-eye view map as viewed from above the site point, and accepts a symbol or site point displayed on the map and selected by the user through user's command by the input device 105 or voice input/output device 104. And the navigation application detects POI information such as position information on the selected site point or symbol and identification ID.

The POI handler 307, using the registration function to the shared object earlier explained in connection with FIG. 7, registers the POI information detected by the navigation application 305 in the shared object 219. The shared object 219 transmits an inter-OS communication message indicative of the fact that the POI information was registered to the communication application 300 previously registered as a transmission destination of the message. In response to the message, the communication application 300 accesses the shared object 219 via the POI manager 303 to read out the POI information registered therein.

Next, the communication application 300 communicates with the information service center 326 via a network such as Internet 325 to transmit the information request to the information service center 326. In response to the request, the information service center 326 analyzes the contents of the request and returns response information corresponding to the request to the communication application 300.

For example, the communication application 300 transmits to the information service center 326 the position information or identification ID included in the POI information referred to by the POI manager 303 as request information. And the communication application accepts information corresponding to the transmitted position information or identification ID from the information service center 326 in the form of an XML format and sends it to the XML purser 301.

Or the communication application 300, on the basis of the position information or identification ID included in the POI information referred to by the POI manager 303, searches the server which offers information to be referred to for the address of the server. And the communication application, using the searched address information, makes access to the server having the address to transmit request information. Then the communication application accepts XML-format information from the server and sends it to the XML purser 301.

The XML purser 301 analyzes the XML-format information accepted from the communication application 300 with respect to tag and separates the information into HTML-format information and POI information. And the purser sends the HTML-format information to the HTML browser 302 and sends the POI information to the POI manager 303.

The HTML browser 302 analyzes the HTML-format information accepted from the XML purser 301 and displays information such as text and image on the display 102.

The POI manager 303, using the registration function to the shared object earlier explained in connection with FIG. 7, registers the POI information accepted from the XML purser 301 in the shared object 219. The shared object 219 transmits an inter-OS communication message indicative of the fact that the POI information was registered to the navigation application 305 previously registered as a transmission destination of the message. In response to the message, the navigation application 305 accesses the shared object 219 via the POI handler 307 and reads out the POI information registered therein. And the navigation application, on the basis of the addition ID included in the POI information, determines the form of how to display the symbol such as color or flashing. As mentioned above, the addition ID is, for example, information indicative of whether or not a restaurant is in business hours or whether or not a parking lot has an unoccupied parking space, and corresponds to dynamic information included in the POI information. The symbols determined in this way is displayed on a map as overlapped with a position determined from the position information included in the POI information.

In this way, in an environment wherein a plurality of operating systems are operated on a single processor, introduction of the shared object 219 enables cooperative operation of respective application programs mounted to the respective operating systems while the operating systems perform their operations as specialties.

Thus, as mentioned above, there can be provided a car navigation apparatus with a good handleability wherein the communication application 300 on the first OS 206 as the general-purpose OS can get from the information service center 326 positional information about a position on the map corresponding to the symbol or site point selected by the user in the navigation application 305 operating on the second OS 207 as the real time OS, and displays it.

Explanation has been explained as to the first embodiment of the present invention.

In accordance with the present embodiment of the car navigation apparatus wherein a plurality of operating systems operate on a single processor, due to the introduction of the aforementioned shared object, registration and reference of position information can be carried out from application programs mounted to the respective operating systems. For this reason, an application program which can cooperatively work with use of position information between the different operating systems can be easily developed.

As a result, there can be realized such cooperative operation that, for example, the application program mounted to one operating system receives position information by means of broadcasting or communication, while the application program mounted to the other operating system displays the received position information as overlapped with the map. Or there can be realized such cooperative operation that, when the application program mounted to one operating system selects a site point on the displayed map to get its information, the application program mounted to the other operating system gets information about the selected site point and displays it.

In this way, introduction of the shared object enables provision of a user interface having a good handleability.

In accordance with the present embodiment, further, during registration or modification of position information in or to the shared object from the application program operating on one operating system, the application program operating on the other operating system can inhibit the position information from being registered in the shared object or being referred thereto. Thus it can be avoided that erroneous position information is referred to.

Further, when the position information was registered in the shared object or updated from the application program of one of a plurality of operating systems, the application program informs the application programs operating on the other operating system of the fact that registration or reference of the position information to the application was made. As a result, in synchronism with the notification, the position information can be immediately referred to, thus improving its real time performance. Further, a processor load necessary for it can be made less.

In the foregoing embodiment, explanation has been made in connection with the case where the present invention is applied to the car navigation apparatus as an example. However, the present invention is not limited only to the specific example. For example, the present invention can be widely applied to an information processing apparatus which has a plurality of operating systems and has an OS switching function of switchingly operating the plurality of operating systems on a single processing.

In the foregoing embodiments, further, a task or operating system for permitting information registration to the shared OBJ 340 for each ID (refer to FIG. 11) of the shared OBJ 340 may be previously defined for filtering. That is, the task or operating system for allowing the registration to the shared OBJ may be restricted according to the type of the shared OBJ 340.

As has been explained in the foregoing, in accordance with the present invention, there can be provided an information processing apparatus wherein a plurality of operating systems operate on a single processor and a framework (shared object) enabling reliable sharing of correct information between the plurality of operating systems is provided. Further, there can be provided a framework which can quickly exchange information between a plurality of operating systems.

Furthermore, the receiver terminal receives broadcast information and on the basis of position and identification information in the broadcast information, displays the broadcast information at a corresponding position on the map as overlapped therewith. As a result, the user of the car navigation apparatus as the receiver terminal can display the site point information on a real time basis on the navigation device.

In addition, when the user selects site point information displayed on the map as a figure, the navigation device, on the basis of detailed information of the broadcast information about a storage device, can accept and display the detailed information from the identified storage device with use of a communication means. As a result, by broadcasting only the basic part (information on position, identifier and storage device) of the site point information, the user can accept information on the site point information through the communication means.

What is claimed is:

1. An information processing apparatus having a plurality of operating systems mounted therein and has an OS switching function of switchingly operating the plurality of operating systems, said apparatus having a sharing function that an application program of one of the plurality of operating systems can refer to shared information registered by an application program of the other operating system in a memory resource capable of being referred to by said plurality of operating systems and an inter-OS communication function, which transfers messages among said plurality of operating systems, wherein said sharing function provides an interface for registration of the shared information in said memory resource by the application programs of said plurality of operating systems and an interface for reference of the shared information registered in said memory resource by the application programs of the plurality of operating systems, and wherein said sharing function acts to inhibit the application program operating on one operating system from registering the shared information in said memory resource or referring thereto while the application program operating on the other operating system is registering the shared information in said memory resource or is referring thereto, and wherein said inter-OS communication function, when said memory resource is accessed by the application program operating on said one operating system, notifies the application program operating on the other operating system registered to the memory resource that the shared information is registered or referred thereto.

2. An information processing apparatus as set forth in claim 1, wherein said sharing function limits the application program or operating system which is allowed to register the shared information in said memory resource according to the type of the shared information.

3. An information processing apparatus as set forth in claim 1, wherein the application program (first application program) of at least one of said plurality of operating systems analyzes a signal received by means of broadcasting or communication, extracts position information therefrom and registers the information in said memory resource as the shared information, whereas the application program (second application program) of at least the other operating system refers to the position information registered in said memory resource as the shared information and displays it on a display unit.

4. An information processing apparatus as set forth in claim 3, wherein said second application program displays a map on said display unit and also displays a symbol indicative of a position on said map specified by the position information registered in said memory resource as the shared information as overlapped with the map.

5. An information processing apparatus as set forth in claim 3, wherein said first application program analyzes a signal received by means of broadcasting or communication, extracts therefrom addition information attached thereto and registers the information in said memory resource as the shared information, whereas said second application program displays a map on said display unit, refers to the position information registered in said memory resource as the shared information and addition information attached thereto, and displays a symbol indicative of a position on said map specified by said position information as overlapped with said map and as varied in shape or color according to contents of said addition information.

6. An information processing apparatus as set forth in claim 1, wherein the application program (first application program) of at least one of said plurality of operating systems displays a map on a display unit, accepts an input of position information and registers the information in said memory resource as the shared information, whereas, the application program (second application program) of at least the other operating system refers to the position information registered in said memory resource as the shared information and searches for information about the position information.

7. An information processing apparatus having a plurality of operating systems mounted therein and has an OS switching function of switchingly operating the plurality of operating systems, said apparatus having a sharing function that an application program of one of the plurality of operating systems can refer to shared information registered by an application program of the other operating system in a memory resource capable of being referred to by said plurality of operating systems and an inter-OS communication function, which transfers messages among said plurality of operating systems, wherein said sharing function provides an interface for registration of the shared information in said memory resource by the application programs of said plurality of operating systems and an interface for reference of the shared information registered in said memory resource by the application programs of the plurality of operating systems, and wherein said inter-OS communication function, by way of said sharing function acts, when the application program of one operating system registers or refers to the shared information in said memory resource, to inform the application program operating on the other operating system of the fact that the shared information was registered in shared memory resource or was referred thereto.

8. An information processing apparatus as set forth in claim 7, wherein said sharing function limits the application program or operating system which is allowed to register the shared information in said memory resource according to the type of the shared information.

9. An information processing apparatus as set forth in claim 7, wherein the application program (first application program) of at least one of said plurality of operating systems analyzes a signal received by means of broadcasting or communication, extracts position information therefrom and registers the information in said memory resource as the shared information, whereas the application program (second application program) of at least the other operating system refers to the position information registered in said memory resources as the shared information and displays it on a display unit.

10. An information processing apparatus as set forth in claim 9, wherein said second application program displays a map on said display unit and also displays a symbol indicative of a position on said map specified by the position information registered in said memory resource as the shared information as overlapped with the map.

11. An information processing apparatus as set forth in claim 9, wherein said first application program analyzes a signal received by means of broadcasting or communication, extracts therefrom addition information attached thereto and registers the information in said memory resource as the shared information, whereas said second application program displays a map on said display unit, refers to the position information registered in said memory resource as the shared information and addition information attached thereto, and displays a symbol indicative of a position on said map specified by said position information as overlapped with said map and as varied in shape or color according to contents of said addition information.

12. An information processing apparatus as set forth in claim 7, wherein the application program (first application program) of at least one of said plurality of operating systems displays a map on a display unit, accepts an input of position information and registers the information in said memory resource as the shared information, whereas, the application program (second application program) of at least the other operating system refers to the position information registered in said memory resource as the shared information and searches for information about the position information.

13. An information processing apparatus comprising:
 a plurality of operating systems mounted therein;
 an operating system switching function which switches between the plurality of operating systems;
 a sharing function that an application program of one of the plurality of operating systems can refer to shared information registered by an application program of the other operating system in a memory resource capable of being referred to by the plurality of operating systems,
 wherein said sharing function inhibits the application program operating on one operating system from registering the shared information in said memory resource or referring thereto while the application program operating on the other operating system is registering the shared information in said memory resource or is referring thereto
 wherein said sharing function provides an interface for registration of the shared information in said memory resource by the application programs of said plurality of operating systems and an interface for reference of the shared information registered in said memory resource by the application programs of the plurality of operating systems.

* * * * *